(12) United States Patent
McDaniel et al.

(10) Patent No.: US 6,600,846 B2
(45) Date of Patent: Jul. 29, 2003

(54) SINGLE-ETALON, MULTI-POINT WAVELENGTH CALIBRATION REFERENCE AND FULLY INTEGRATED OPTICAL SYSTEM USING THE SAME

(75) Inventors: Donald L. McDaniel, North Andover, MA (US); Daryoosh Vakhshoori, Cambridge, MA (US); Masud E. Azimi, Nashua, NH (US); Parviz Tayebati, Boston, MA (US)

(73) Assignee: CoreTek, Inc., Wilmington, MA (US)

( * ) Notice: Subject to any disclaimer, the term of this patent is extended or adjusted under 35 U.S.C. 154(b) by 0 days.

(21) Appl. No.: 09/761,008

(22) Filed: Jan. 15, 2001

(65) Prior Publication Data

US 2002/0094148 A1 Jul. 18, 2002

(51) Int. Cl.[7] .................................................. G02B 6/12
(52) U.S. Cl. ........................... 385/14; 359/110; 359/130
(58) Field of Search ............................ 385/14; 359/110, 359/130, 173

(56) References Cited

U.S. PATENT DOCUMENTS

| | | | | |
|---|---|---|---|---|
| 5,251,275 A | * | 10/1993 | Kuriyama et al. | ............. 385/14 |
| 5,283,845 A | * | 2/1994 | Ip | ............... 359/118 |
| 5,646,762 A | * | 7/1997 | Delavaux et al. | ........... 359/134 |
| 5,815,294 A | * | 9/1998 | Ishikawa et al. | ............ 359/110 |
| 6,262,822 B1 | * | 7/2001 | Obhi et al. | ................. 359/110 |
| 6,498,800 B1 | * | 12/2002 | Watterson et al. | ............ 372/20 |

* cited by examiner

Primary Examiner—Ellen E. Kim
(74) Attorney, Agent, or Firm—Pandiscio & Pandiscio (57) ABSTRACT

A fully integrated optical system for monitoring the channels of an optical fiber in a WDM fiberoptic system.

5 Claims, 13 Drawing Sheets

SINGLE-ETALON, MULTI-POINT WAVELENGTH CALIBRATION REFERENCE AND FULLY INTEGRATED OPTICAL SYSTEM USING THE SAME

FIELD OF THE INVENTION

This invention relates to photonic devices in general, and more particularly to tunable filters and tunable lasers and filter based optical spectrum analyzers.

BACKGROUND OF THE INVENTION

Tunable Fabry-Perot filters and tunable vertical cavity surface emitting lasers (VCSEL's) have recently generated considerable interest in the art. This is because these devices are believed to have application for a wide range of different optical components and systems, e.g., wavelength division multiplexing (WDM) fiberoptic systems, switches, routers, highly compact spectroscopic interferometers, optical transceivers, etc.

In some tunable Fabry-Perot filters and in some tunable VCSEL's, tuning is achieved by using an electrostatic field to move a top mirror relative to a bottom mirror, whereby to change the length of the Fabry-Perot cavity and hence tune the wavelength of the device.

While such a construction is advantageous in that it provides a fast and easy way to tune the device, in practice it has proven difficult to produce relatively uniform devices. Significant performance variations typically occur from device-to-device and from batch-to-batch.

SUMMARY OF THE INVENTION

As a result, one object of the present invention is to provide a novel wavelength reference apparatus for use in calibrating a tunable Fabry-Perot filter and/or a tunable VSCEL, whereby the device may be tuned to a precise, known wavelength.

Another object of the present invention is to provide a novel method for calibrating a tunable Fabry-Perot filter and/or a tunable VSCEL, whereby the device may be tuned to a precise, known wavelength.

Still another object of the present invention is to provide a novel fully integrated optical system incorporating the aforementioned wavelength reference apparatus.

These and other objects are addressed by the present invention.

In one form of the invention, there is provided a wavelength reference apparatus for use in calibrating a tunable Fabry-Perot filter or a tunable VCSEL, whereby the device may be tuned to a precise, known wavelength, the wavelength reference apparatus comprising an LED, where the LED is chosen so as to have an emission profile which varies with wavelength; an etalon, where the etalon is chosen so as to have a transmission profile which comprises a comb of transmission peaks, with each transmission peak occurring at a precise, known wavelength; and a detector for detecting the light emitted by the LED and passing through the etalon; whereby when a tunable Fabry-Perot filter or tunable VCSEL is positioned between the etalon and the detector, and the device is swept through its tuning range by varying the tuning voltage applied to the device, the known transmission wavelengths established by the LED and the etalon can be correlated to counterpart tuning voltages of the device, whereby to calibrate the device.

In another form of the invention, there is provided a novel method for calibrating a tunable Fabry-Perot filter or a tunable VCSEL, whereby the device may be tuned to a precise, known wavelength, comprising the steps of: (1) energizing an LED so as to produce an emission of light, the LED being chosen so as to have an emission profile which varies with wavelength; (2) passing the light output by the LED through an etalon so as to generate a comb of known transmission peaks, with each transmission peak occurring at a precise, known wavelength; (3) passing light from the etalon to the device; and (4) sweeping the device through its tuning range by varying the tuning voltage applied to the device, whereby a correlation may be established between the known wavelength of each transmission peak and the tuning voltage associated with that wavelength, whereby to calibrate the device.

And in another form of the invention, there is provided a novel fully integrated optical system for monitoring the channels of an optical fiber in a WDM fiberoptic system, the fully integrated optical system comprising an input from the optical fiber; a tunable filter having a first end and a second end, the tunable filter being positioned so as to receive light from the input at its first end; a first beam splitter for receiving light emerging from the second end of the tunable filter; a first detector for receiving light from the first beam splitter and detecting the same; and wavelength reference apparatus for use in calibrating the tunable filter, whereby the tunable filter may be tuned to a precise, known wavelength, the wavelength reference apparatus comprising: an LED positioned so that light emitted by the LED enters the second end of the tunable filter, the LED having an emission profile which varies with wavelength; a second beam splitter for receiving light emerging from the first end of the tunable filter; an etalon for receiving light from the second beam splitter, the etalon having a transmission profile which comprises a comb of transmission peaks, with each transmission peak occurring at a precise, known wavelength; and a second detector for detecting the light passing through the etalon; whereby when the LED is energized and the tunable filter is swept through its tuning range by varying the tuning voltage applied to the tunable filter, the known transmission wavelengths established by the LED and the etalon can be correlated to counterpart tuning voltages of the tunable filter, whereby to calibrate the tunable filter; and whereby when light from the input is passed through the tunable filter, the tunable filter may be tuned to a selected channel and the first detector may be used to detect light present on that channel.

And in another form of the invention, there is provided a novel fully integrated optical system for monitoring the channels of an optical fiber in a WDM fiberoptic system, the fully integrated optical system comprising an input from the optical fiber; a tunable filter having a first end and a second end, the tunable filter being positioned so as to receive light from the input at its first end; a detector for receiving light from the tunable filter and detecting the same; and wavelength reference apparatus for use in calibrating the tunable filter, whereby the tunable filter may be tuned to a precise, known wavelength, the wavelength reference apparatus comprising: an LED, the LED having an emission profile which varies with wavelength; an etalon for receiving light from the LED, the etalon having a transmission profile which comprises a comb of transmission peaks, with each transmission peak occurring at a precise, known wavelength; and a shutter having (i) a first position wherein light from the etalon will be directed through the tunable filter and onto the detector, and (ii) a second position wherein light from the input will be directed through the tunable filter and onto the detector; whereby when the shutter is placed in its first position and the LED is energized and the tunable filter is swept through its tuning range by varying the tuning voltage applied to the tunable filter, the known transmission wavelengths established by the LED and the etalon can be correlated to counterpart tuning voltages of the tunable filter, whereby to calibrate the tunable filter; and whereby when the shutter is placed in its second position and light from the input is passed through the tunable filter, the tunable filter may be tuned to a selected channel and the detector may be used to detect light present on that channel.

BRIEF DESCRIPTION OF THE DRAWINGS

These and other objects and features of the present invention will be more fully disclosed or rendered obvious by the following detailed description of the preferred embodiments of the invention, which is to be considered together with the accompanying drawings wherein like numbers refer to like parts and further wherein.

DETAILED DESCRIPTION OF THE PREFERRED EMBODIMENTS

In pending prior U.S. patent application Ser. No. 09/105, 399, filed Jun. 26, 1998 by Parviz Tayebati et al. for MICROELECTROMECHANICALLY TUNABLE, CONFOCAL, VERTICAL CAVITY SURFACE EMITTING LASER AND FABRY-PEROT FILTER, and in pending prior U.S. patent application Ser. No. 09/543,318, filed Apr. 5, 2000 by Peidong Wang et al. for SINGLE MODE OPERATION OF MICROELECTROMECHANICALLY TUNABLE, HALF-SYMMETRIC, VERTICAL CAVITY SURFACE EMITTING LASERS, both of which patent applications are hereby incorporated herein by reference, there are disclosed tunable Fabry-Perot filters and tunable vertical cavity surface emitting lasers (VCSEL's).

Figure 1:
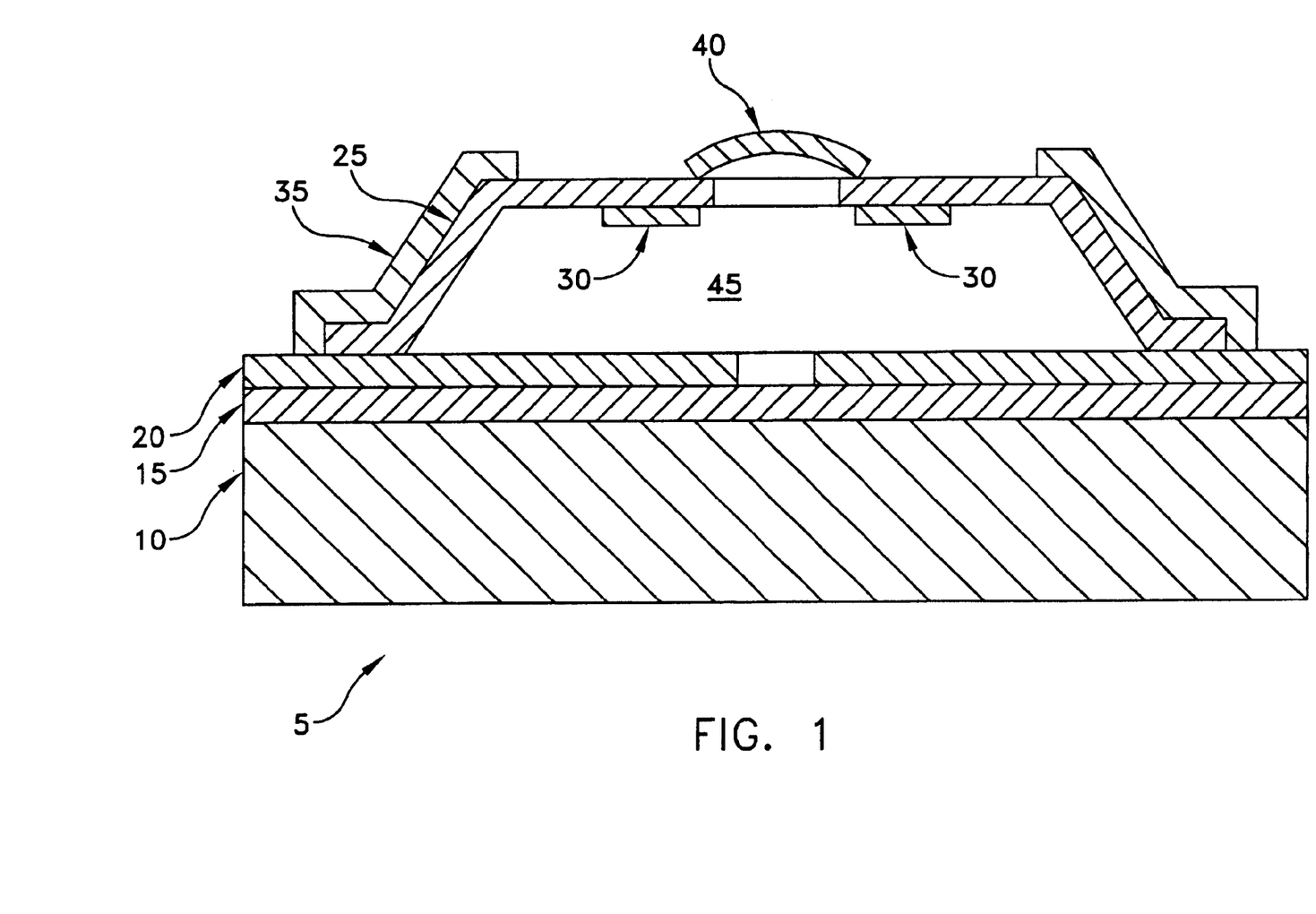
FIG. 1 is a schematic side sectional view of a tunable Fabry-Perot filter.

Looking now at FIG. 1, there is shown a tunable Fabry-Perot filter 5. Filter 5 generally comprises a substrate 10, a bottom mirror 15 mounted to the top of substrate 10, a bottom electrode 20 mounted to the top of bottom mirror 15, a thin membrane support 25 atop bottom electrode 20, a top electrode 30 fixed to the underside of thin membrane support 25, a reinforcer 35 fixed to the outside perimeter of thin membrane support 25, and a confocal top mirror 40 set atop thin membrane support 25, with an air cavity 45 being formed between bottom mirror 15 and top mirror 40.

As a result of this construction, a Fabry-Perot filter is effectively created between top mirror 40 and bottom mirror 15. Furthermore, by applying an appropriate voltage across top electrode 30 and bottom electrode 20, the position of top mirror 40 can be changed relative to bottom mirror 15, whereby to change the length of the Fabry-Perot cavity, and hence tune Fabry-Perot filter 5.

Figure 2:
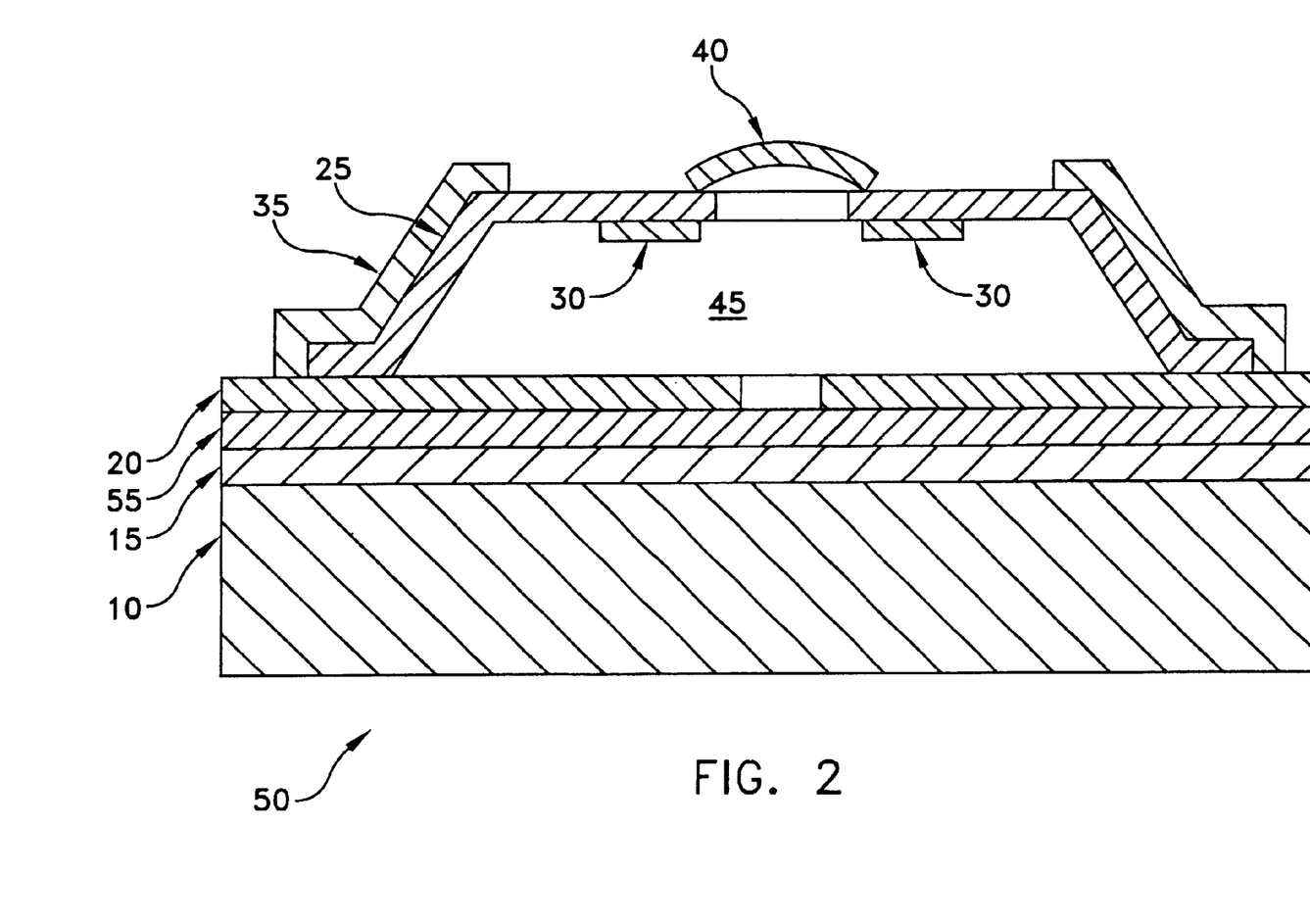
FIG. 2 is a schematic side sectional view of a tunable VCSEL.

Correspondingly, and looking next at FIG. 2, a tunable vertical cavity surface emitting laser (VCSEL) 50 can be constructed by positioning a gain region (or "active region") 55 between bottom mirror 15 and bottom electrode 20. As a result, when gain region 55 is appropriately stimulated, e.g., by optical pumping, lasing can be established within air cavity 45, between top mirror 40 and bottom mirror 15. Furthermore, by applying an appropriate voltage across top electrode 30 and bottom electrode 20, the position of top mirror 40 can be changed relative to bottom mirror 15, whereby to change the length of the laser's resonant cavity, and hence tune VCSEL 50.

As noted above, tunable Fabry-Perot filters and tunable VCSEL's of the type disclosed above are advantageous, since they can be quickly and easily tuned by simply changing the voltage applied across the top electrode and the bottom electrode.

However, it has been found that tunable Fabry-Perot filters and tunable VCSEL's of the type disclosed above have performance characteristics which can vary slightly from unit to unit. In addition, it has also been found that the performance characteristics of any given unit can vary slightly in accordance with its age, temperature, etc. Accordingly, it is generally not possible to precisely predict in advance the exact voltage which must be applied to a particular device in order to tune that device to a specific wavelength. This can present an issue in some applications, particularly telecommunications applications, where the devices may need to be tuned to precise, known wavelengths (e.g., the ITU WDM grid).

Figure 3:
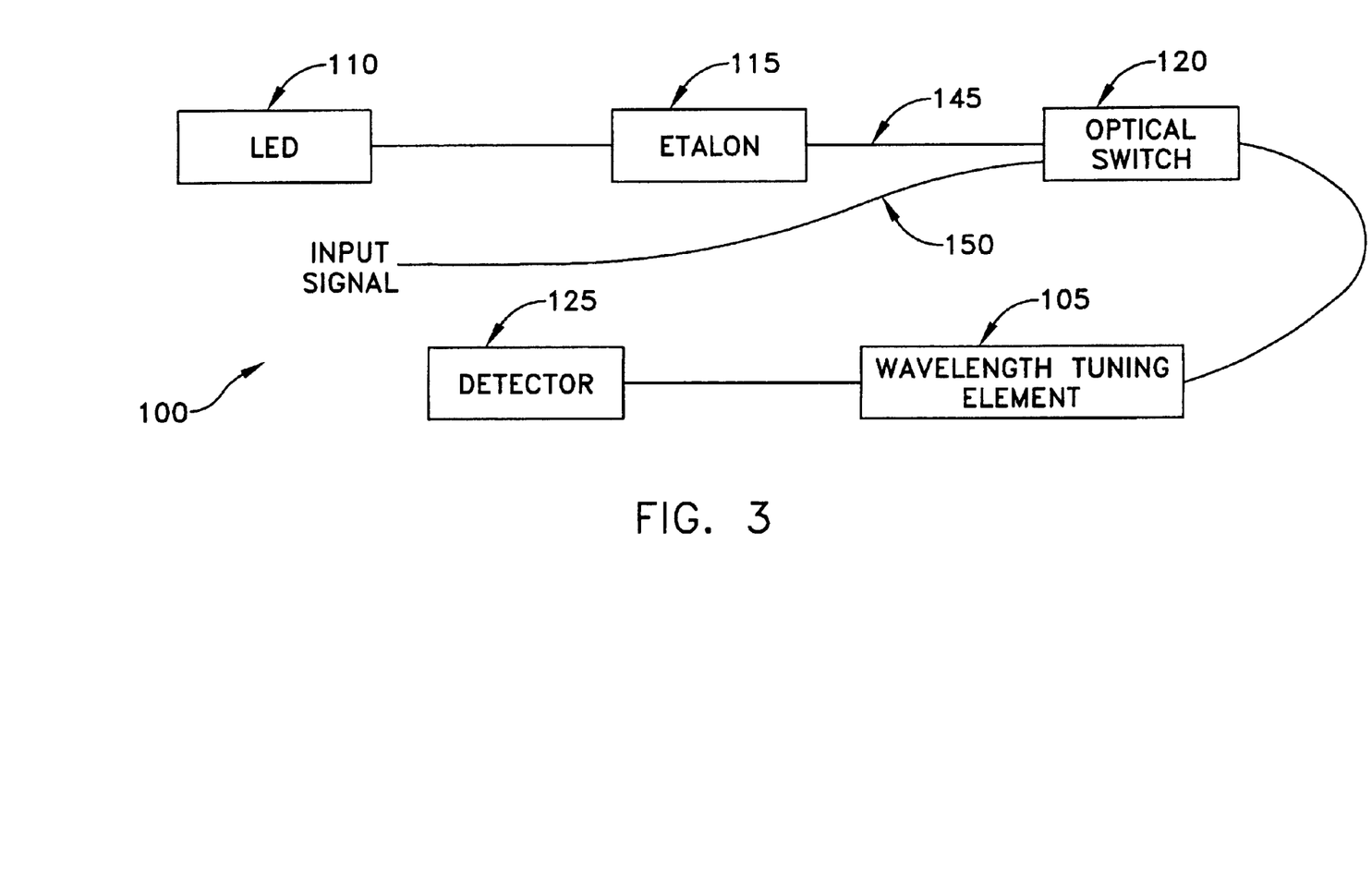
FIG. 3 is a schematic diagram of a novel wavelength reference apparatus for use in calibrating a tunable Fabry-Perot filter and/or a tunable VCSEL, whereby the device may be tuned to a precise, known wavelength.

Looking next at FIG. 3, there is shown a system 100 which comprises a wavelength reference apparatus for use in calibrating a tunable Fabry-Perot filter and/or a tunable VCSEL, whereby the device may be tuned to a precise, known wavelength.

More particularly, system 100 generally comprises a tunable Fabry-Perot filter or tunable VCSEL 105, a light emitting diode (LED) 110, an etalon 115, an optical switch 120, and a detector 125.

The tunable Fabry-Perot filter or tunable VCSEL 105 is preferably a tunable Fabry-Perot filter or tunable VCSEL of the type disclosed above. For convenience of description, tunable device 105 will hereinafter generally be described in the context of being a tunable Fabry-Perot filter; however, it will be appreciated that the present invention is equally applicable to the situation where tunable device 105 comprises a tunable VCSEL.

Figure 4:
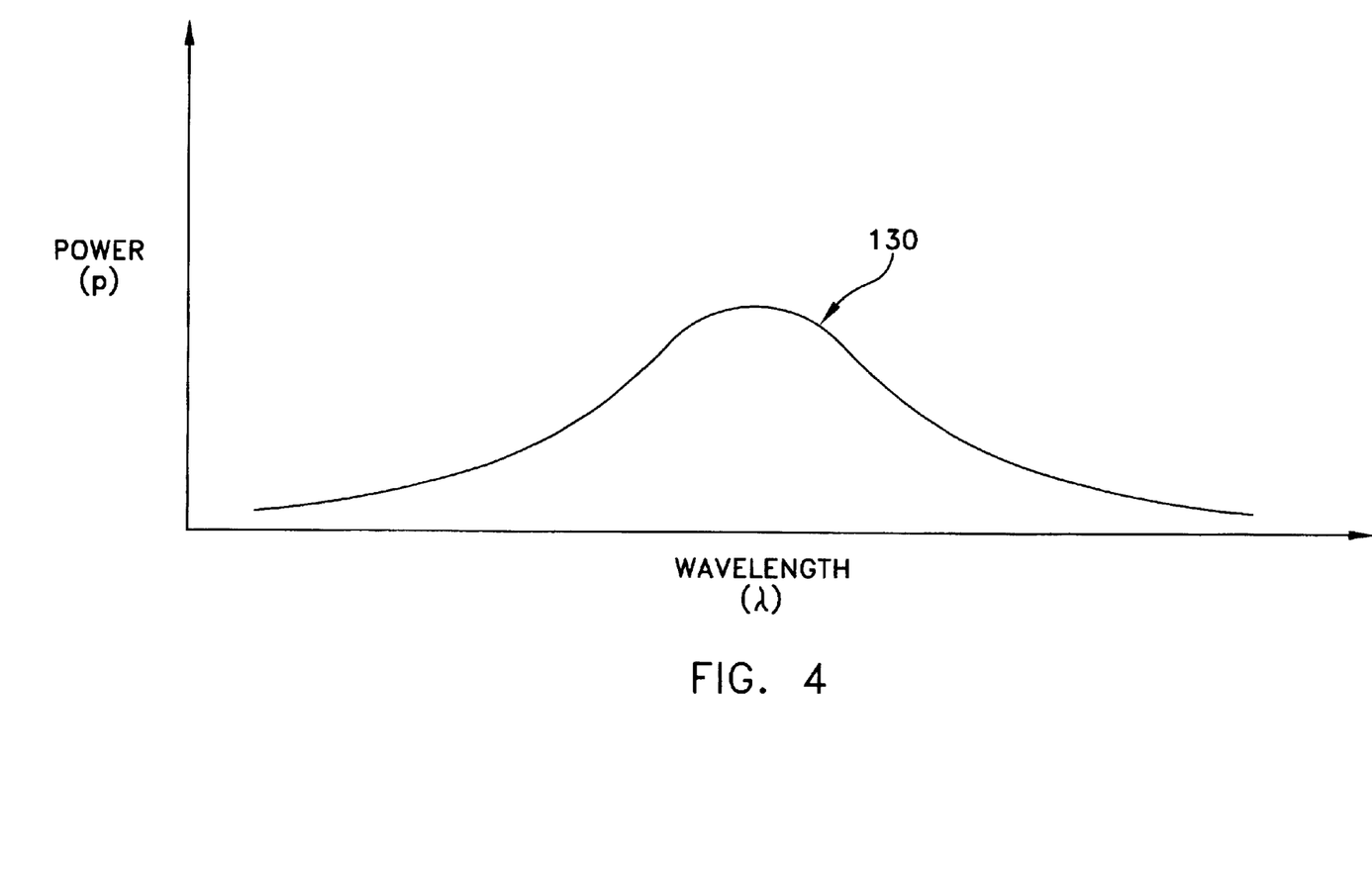
FIG. 4 is a schematic diagram of the emission profile of an LED incorporated into the wavelength reference apparatus shown in FIG. 3.

LED 110 comprises an LED which has an emission profile 130 of the sort shown in FIG. 4, i.e., a power output which varies with wavelength. It will be appreciated that emission profile 130 is an inherent characteristic of the specific LED chosen for incorporation in the system, and thus is known to the system. By way of example but not limitation, LED 110 may comprise a broadband InGaAsP/InP LED.

Figure 5:
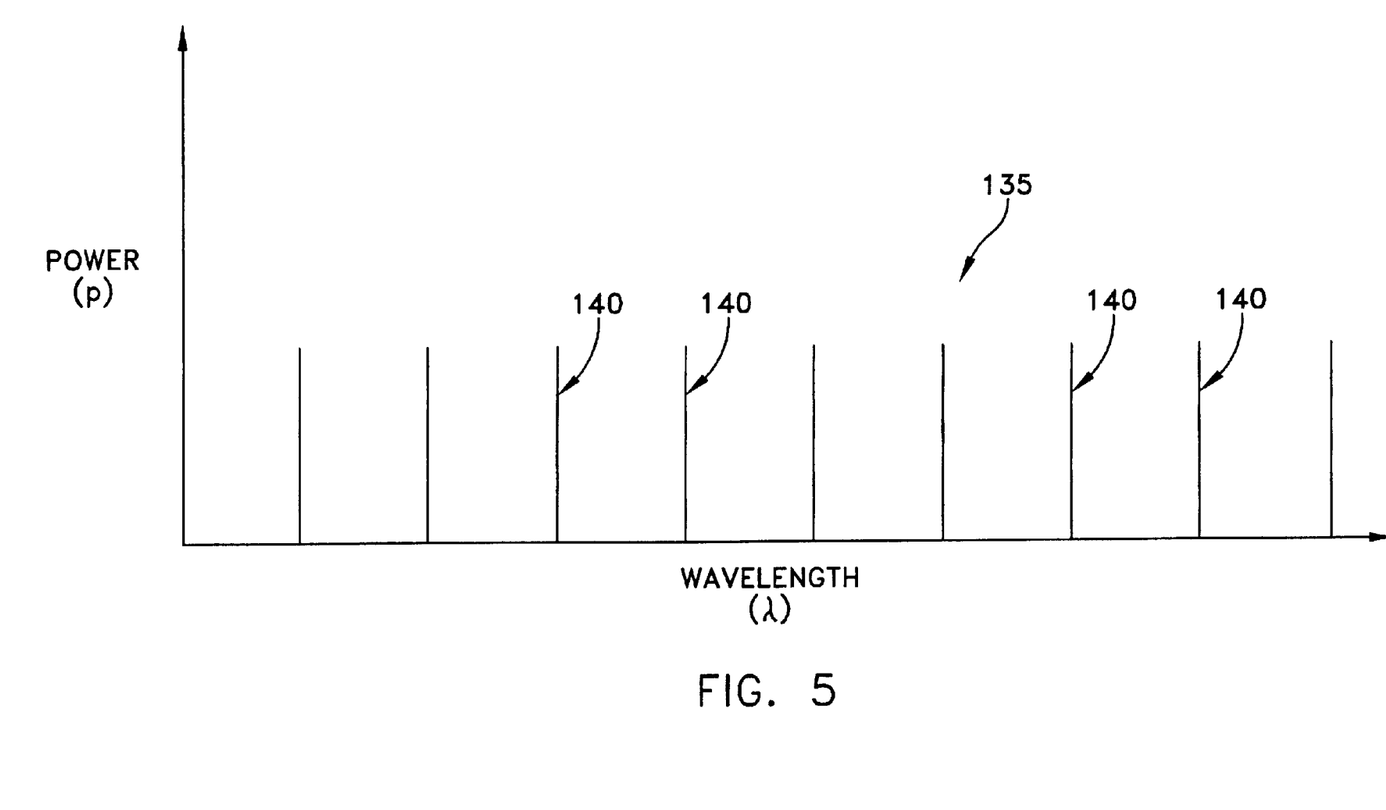
FIG. 5 is a schematic diagram of the transmission profile of an etalon incorporated into the wavelength reference apparatus shown in FIG. 3.

Etalon 115 comprises a Fabry-Perot etalon which has a transmission profile 135 of the sort shown in FIG. 5, i.e., a comb of known transmission peaks 140 spaced across a range of wavelengths. It will be appreciated that the exact locations (i.e., wavelengths) of transmission peaks 140 are an inherent characteristic of the specific etalon chosen for incorporation in the system, and thus are known to the system. Significantly, the specific wavelengths of transmission peaks 140 are a function of the etalon's substrate thickness and refractive index, neither of which varies significantly with time. By way of example but not limitation, etalon 115 may comprise a solid or air-spaced filter, including a MEMs (microelectromechanical) etalon.

Figure 6:
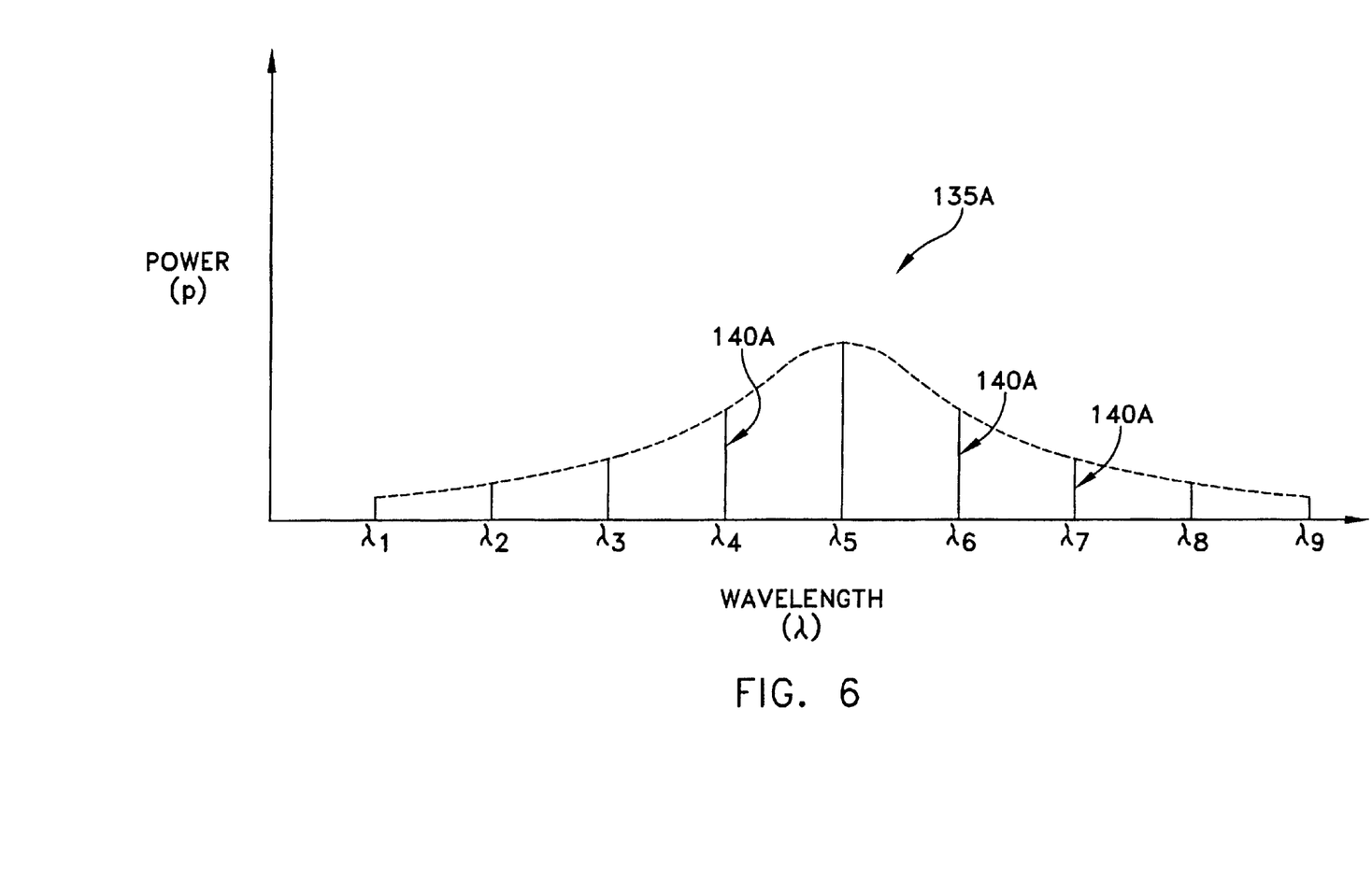
FIG. 6 is a schematic diagram of the composite transmission profile of the LED/etalon combination incorporated into the wavelength reference apparatus shown in FIG. 3.

By placing LED 110 and etalon 115 in series, in the manner shown in FIG. 3, the LED emission profile 130 will be tailored by the transmission profile 135 of etalon 115, whereby to produce a composite transmission profile 135A of the sort shown in FIG. 6, i.e., a comb of known transmission peaks 140A. Significantly, the specific wavelengths $\lambda_1$, $\lambda_2$, $\lambda_3$, etc. of each of the transmission peaks 140A will always be precisely and absolutely known, since the emission characteristics of LED 110, and the transmission characteristics of etalon 115, are known.

In this respect it should be appreciated that LED 110 and etalon 115 are used together, in series, so as to provide a unique and unambiguous transmission profile 135A (FIG. 6), i.e., a unique and unambiguous comb of known transmission peaks 140A. If etalon 115 were to be used alone, its transmission profile 135 (FIG. 5) could result in "order ambiguity", i.e., confusion in differentiating one transmission peak 140 from another transmission peak 140. With the present invention, this ambiguity is resolved by using the spectral distribution of LED 110, which varies with wavelength. In effect, using LED 110 and etalon 115 in series imposes an amplitude envelope on the etalon transmission comb, such that the transmission peaks 140A can be uniquely identified by sweeping the device through a range of wavelengths. Alternatively, other order resolution schemes may also be employed, e.g., adding a reference or band-limiting filter in-line to restrict the number of etalon orders observed, or designing the stop-band of the etalon mirrors in such a way as to limit the etalon orders observed, etc.

Optical switch 120 comprises any optical switch capable of switching between (i) a line 145 receiving the output of etalon 115, and (ii) a line 150 receiving an input signal, e.g., from a wavelength division multiplexing (WDM) optical network system.

Detector 125 comprises any suitable optical detector of the sort well known in the art, e.g., an InGaAs optical detector.

In order to calibrate tunable filter 105, optical switch 120 is set so as to select the input from line 145 (i.e., the input from LED 110 and etalon 115), and LED 110 is energized. This causes light, with the known transmission profile 135A (FIG. 6) to be input to tunable filter 105. Tunable filter 105 is then swept across its tuning range as detector 125 is monitored. This is done by sweeping the tuning voltage applied to the device. When detector 125 detects an output peak, the light passing through tunable filter 105 will be at a wavelength corresponding to a specific transmission peak 140A. By correlating a specific tuning voltage $V_1$, $V_2$, $V_3$, etc. with a specific known transmission peak $\lambda_1$, $\lambda_2$, $\lambda_3$, etc., tunable filter 105 may have its tuning voltage calibrated against the known wavelengths of transmission peaks 140A. A data table such as that shown in FIG. 7 may be constructed to correlate a specific tuning voltage against a specific, known wavelength. This data table may then be used to select the proper tuning voltage for a particular target wavelength.

Figure 7:
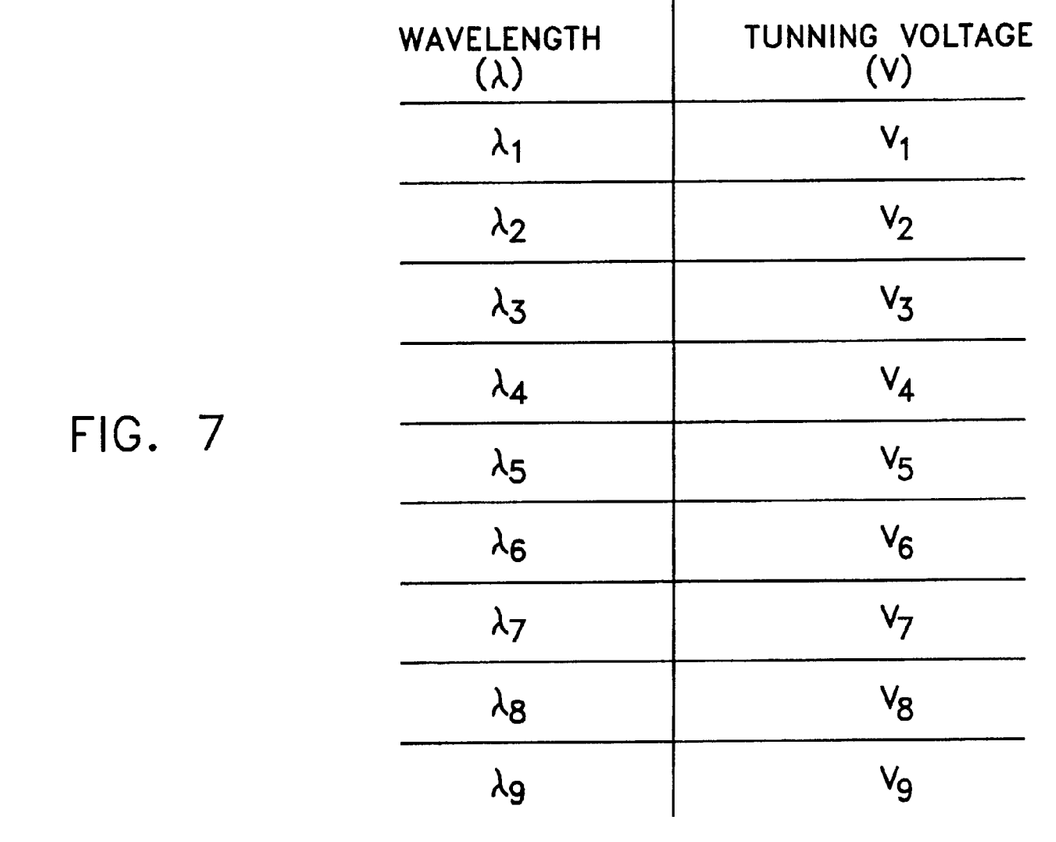
FIG. 7 is a lookup table illustrating the correlation between the tuning voltage, and the transmission wavelength, for a tunable Fabry-Perot filter and/or a tunable VESEL, whereby the device may be tuned to a precise, known wavelength.

To the extent that transmission peaks 140A are spaced more widely apart than the desired tuning resolution for tunable filter 105, intermediate values may be interpolated from the information available in the data table. Thus, for example, to the extent that it is desired to tune the device to a wavelength between $\lambda_3$ and $\lambda_4$, an appropriate tuning voltage located between $V_3$ and $V_4$ will be applied to the device. Such interpolation may be effected using both linear, and non-linear, interpolation techniques.

To the extent that the span of transmission peaks 140A (FIG. 6) covers something less than the complete tuning range of tunable filter 105, it may be necessary to extrapolate from the information available in the data table. Such extrapolation may be effected using both linear, and non-linear, extrapolation techniques.

Two preferred non-linear interpolation/extrapolation techniques are polynomial extrapolation and cubic spline fit extrapolation.

Once the system has been used to properly calibrate tunable filter 105, switch 120 may be reset so as to select the input from line 150 (i.e., the input signal from, for example, a WDM optical network system). Thereafter, the calibrated tunable filter 105 may be used to tune that input signal as desired.

If desired, switch 120 may be replaced by an optical coupler and shutter assembly. In this situation, when calibration is to be effected, the shutter is activated so as to block the input from line 150, and then LED 110 is energized. After calibration has been completed, LED 110 is turned off and the shutter reset so that the input from line 150 will be passed to tunable filter 105.

The optical system shown in FIG. 3 has significant utility in many different applications, such as in WDM optical network systems. For example, where an optical fiber is simultaneously carrying numerous channels (i.e., signals at different wavelengths), it is generally desirable to periodically monitor each of those channels so as to ensure that they are operating properly. Such monitoring typically involves, at the very least, checking for the presence of a signal at the channel's wavelength, but it may also involve a more substantial review or analysis of that signal (i.e., a review or analysis of the actual content of that signal).

To that end, the optical system shown in FIG. 3 may be configured so that element 105 comprises a tunable filter, and line 150 is connected to the optical fiber which is to have its channels monitored. Then tunable filter 105 is calibrated. This is done in the manner previously described. More particularly, optical switch 120 is configured so as to select the input from line 145 (i.e., the input signal from LED 110 and etalon 115), and LED 110 is energized. This causes light, with the known transmission profile 135A (FIG. 6) to be input to tunable filter 105. Tunable filter 105 is then swept across its tuning range as detector 125 is monitored. This is done by sweeping the tuning voltage applied to the device. When detector 125 detects an output peak, the light passing through tunable filter 105 will be at a wavelength corresponding to a specific transmission peak 140A. By correlating a specific tuning voltage $V_1$, $V_2$, $V_3$, etc. with a known transmission peak $\lambda_1$, $\lambda_2$, $\lambda_3$, etc., tunable filter 105 may have its tuning voltage calibrated against the known wavelengths of transmission peaks 140A, whereby to calibrate the tunable filter.

At a desired time, switch 120 is reset. This reset operation configures switch 120 to select the input from line 150 (i.e., the optical fiber which is to have its channels monitored). Once switch 120 has been successfully reset, tunable filter 105 is tuned to a first channel which is to be monitored (i.e., by appropriately setting its tuning voltage to a value which corresponds to the wavelength of the desired channel). Subsequently, detector 125 is monitored to determine if there is a signal present on this first channel and, if desired, to determine the nature or characteristics of that signal.

Once the first channel has been analyzed, tunable filter 105 is tuned (i.e., by appropriately changing its tuning voltage) to the wavelength of a second channel which is to be monitored. Detector 125 is then used to check the signal on this second channel. This process is then repeated as desired so as to provide the desired channel monitoring.

Significantly, tunable filter 105 may be quickly and easily re-calibrated at any time, i.e., by simply resetting optical switch 120 so as to select the input from line 145 (i.e., the input signal from LED 110 and etalon 115), energizing LED 110, and repeating the calibration procedure previously described. Tunable filter 105 may then be returned to its monitoring function by simply configuring switch 120 to select the input from line 150.

The optical system shown in FIG. 3 may be fabricated as a series of separately packaged components connected together by optical fiber, e.g., the components may be fiber pigtailed and the components spliced together. However, significant cost and space reductions can be achieved when all of these components are integrated within a single package. The optical losses of the system will also be reduced by such integration, thereby also improving the system noise floor.

Figure 8:
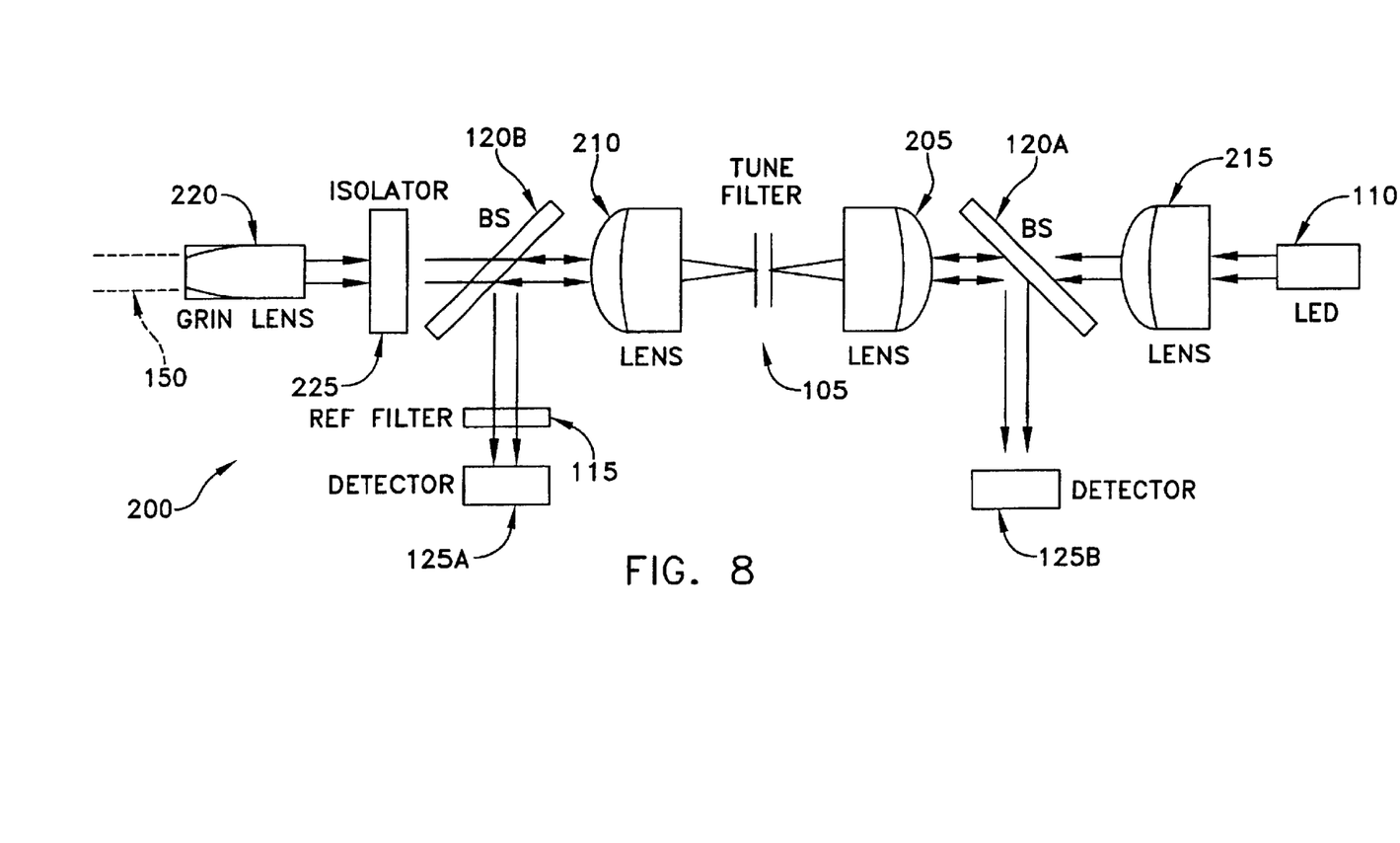
FIG. 8 is a schematic diagram of a novel fully integrated optical system incorporating the wavelength reference apparatus of FIG. 3.

Referring now to FIG. 8, there is shown an optical system 200 which may be used in a WDM optical network system to monitor the different channels in an optical fiber. Optical system 200 effectively incorporates the optical system shown in FIG. 3. More particularly, optical system 200 comprises the aforementioned configuration of tunable filter 105, LED 110 and etalon 115. In the present system 200, optical switch 120 is replaced by a pair of beam splitters 120A and 120B, and detector 125 is replaced by a pair of detectors 125A and 125B. Additionally, lenses 205 and 210 are positioned on either side of tunable filter 105, a lens 215 is positioned between LED 110 and beam splitter 120A, and a GRIN lens 220 is positioned between line (e.g., optical fiber) 150 and beam splitter 120B. In addition, an isolator 225 is preferably positioned between GRIN lens 220 and beam splitter 120B. Isolator 225 prevents unwanted light from passing back down line 150.

Figure 9:
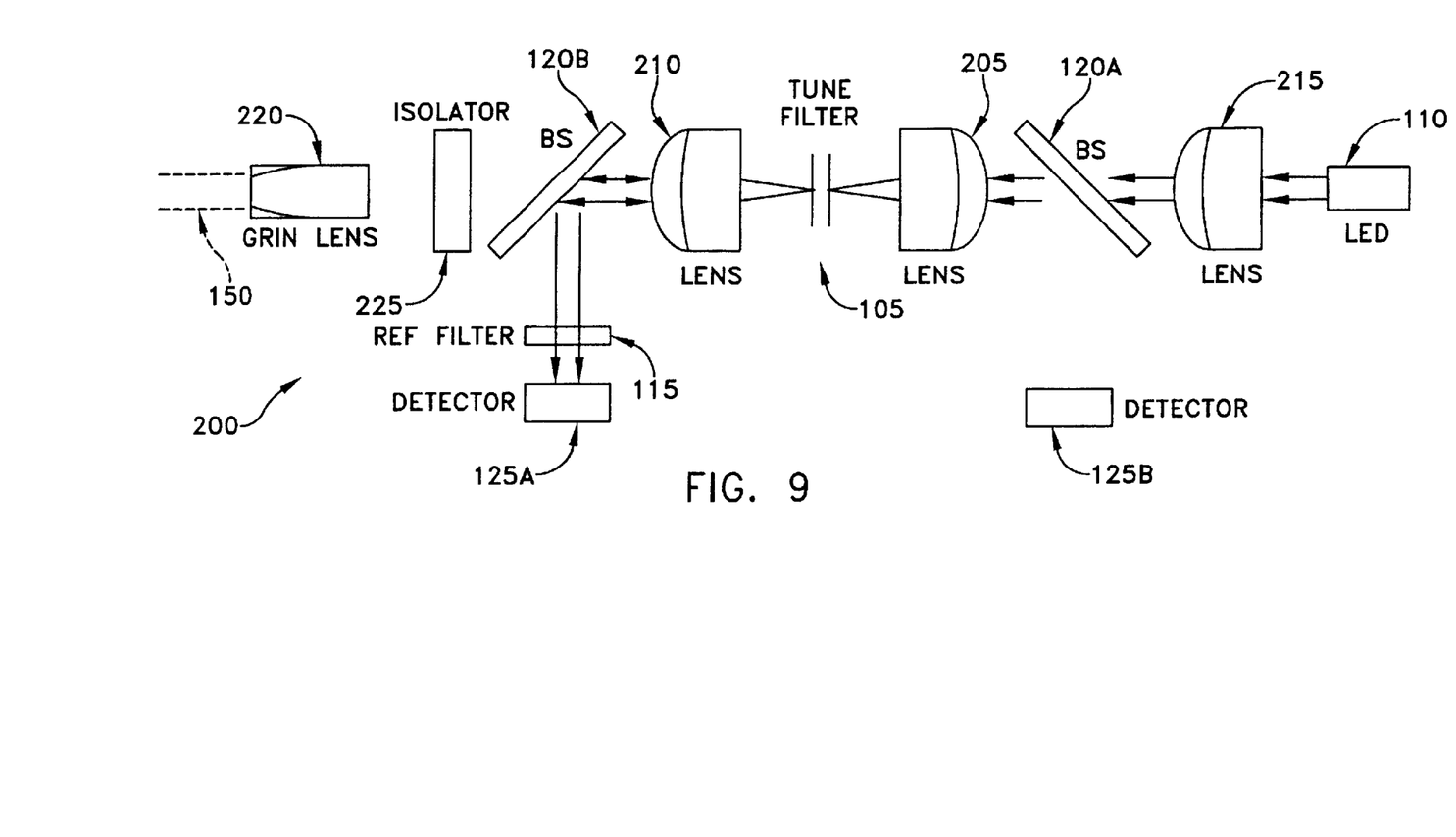
FIG. 9 is a schematic diagram like that of FIG. 8, except that it has been modified to show only the calibration light path.

Looking next at FIG. 9, optical system 200 is intended to be calibrated as follows. LED 110 is energized so that it's light passes through lens 215, through beam splitter 120A, through lens 205, through tunable filter 105, through lens 210, reflects off beam splitter 120B, passes through etalon 115 and onto detector 125A. Then tunable filter 105 is swept through its tuning range (i.e., by sweeping the tuning voltage applied to the tunable filter, and hence sweeping through the associated optical wavelengths) as detector 125A is monitored, whereby to calibrate the tunable filter in the manner previously described.

Figure 10:
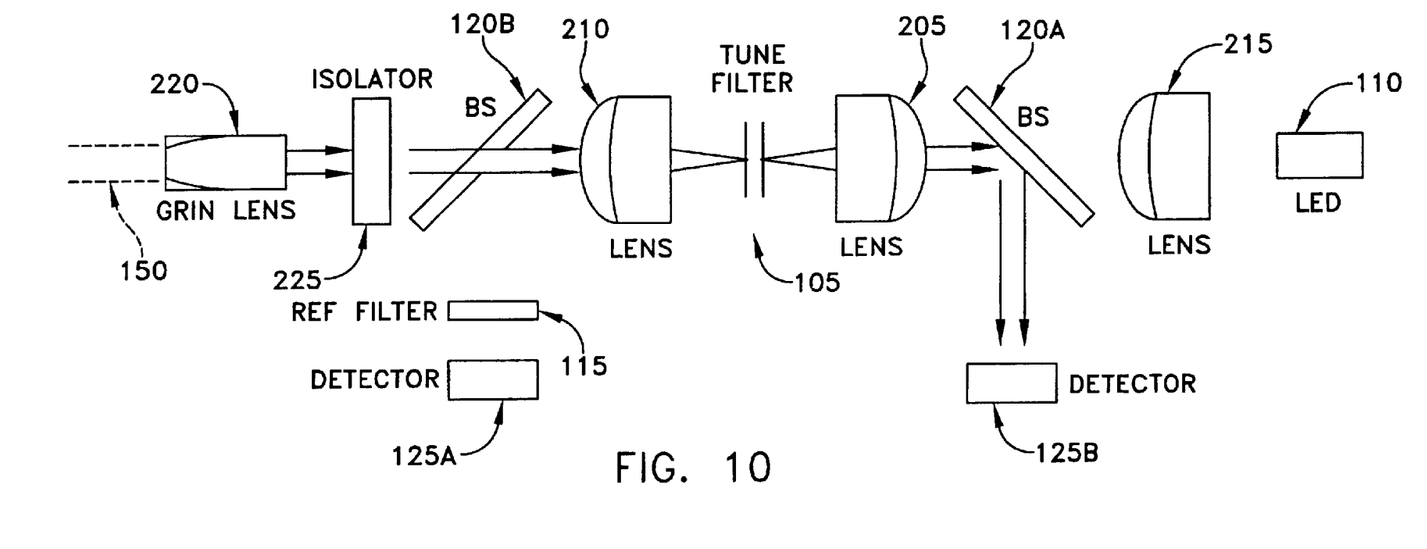
FIG. 10 is a schematic diagram like that of FIG. 8, except that it has been modified to show only the input signal light path.

Looking next at FIG. 10, optical system 200 may then be used to monitor the different channels on an optical fiber as follows. A signal from line 150 passes through GRIN lens 220, through isolator 225, through beam splitter 120B, through lens 210, through tunable filter 105, through lens 205, reflects off beam splitter 120A, and onto detector 125B. Then tunable filter 105 is tuned (i.e., by appropriately setting its tuning voltage) to a first channel which is to be monitored, and detector 125B is monitored to determine if there is a signal present on this first channel and, if desired, the nature of the signal. Then tunable filter 105 is tuned (i.e., by appropriately changing its tuning voltage) to a second channel which is to be monitored, and detector 125B used to check the signal on this second channel. This process may be repeated as desired so as to provide the desired channel monitoring.

Significantly, tunable filter 105 may be quickly and easily re-calibrated at any time, i.e., by energizing LED 110 and monitoring detector 125A as tunable filter 105 is swept across its tuning range, whereby to re-calibrate tunable filter 105 for each wavelength in the tuning range, in the manner previously described.

It will be appreciated that optical system 200 utilizes a bi-directional optical path in which the input signal travels in one direction and the calibration signal travels in the other direction. This results in a compact optical system that segregates the input and calibration signals. Beam splitters 120A and 120B are used to combine the beams so that they share the same common tunable filter 105. Surfaces are preferably anti-reflection coated so as to reduce the crosstalk imparted by spurious reflections. Also, curved surfaces are preferably presented to collimated beams, and flat surfaces are preferably presented to diverging/converging beams, thereby further reducing the influence of reflections.

Figure 11:
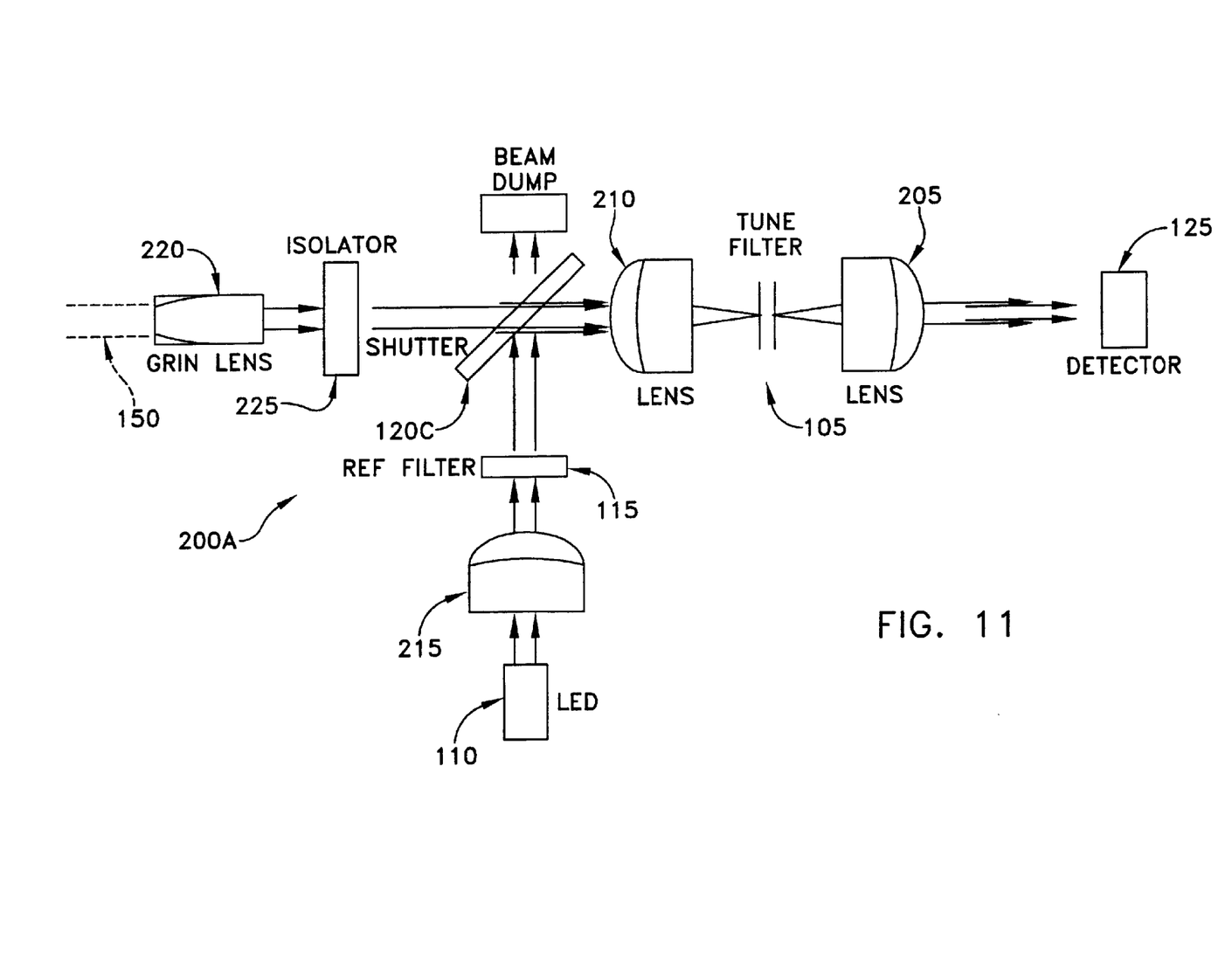
FIG. 11 is a schematic diagram of another novel fully integrated optical system incorporating the wavelength reference apparatus of FIG. 3.

Looking next at FIG. 11, there is shown an optical system 200A which may also be used in a WDM optical network system to monitor the different channels in an optical fiber. Optical system 200A also effectively incorporates the optical system shown in FIG. 3. More particularly, optical system 200A comprises the aforementioned tunable filter 105, LED 110, etalon 115 and detector 125. Optical switch 120 is replaced by a shutter 120C. For the purposes of the present invention, the term "shutter" is meant to include devices capable of selectively passing or blocking a beam of light. Shutter 120C is configured so that (1) when it is put in a first position, light from etalon 115 will be directed through tunable filter 105 and onto detector 125, and (2) when it is put in a second position, light from line 150 will be directed through tunable filter 105 and onto detector 125. Additionally, lenses 205 and 210 are positioned on either side of tunable filter 105. Lens 215 is positioned between LED 110 and etalon 115, and GRIN lens 220 is positioned between line 150 and shutter 120C. In addition, isolator 225 is preferably positioned between GRIN lens 220 and shutter 120C.

Figure 12:
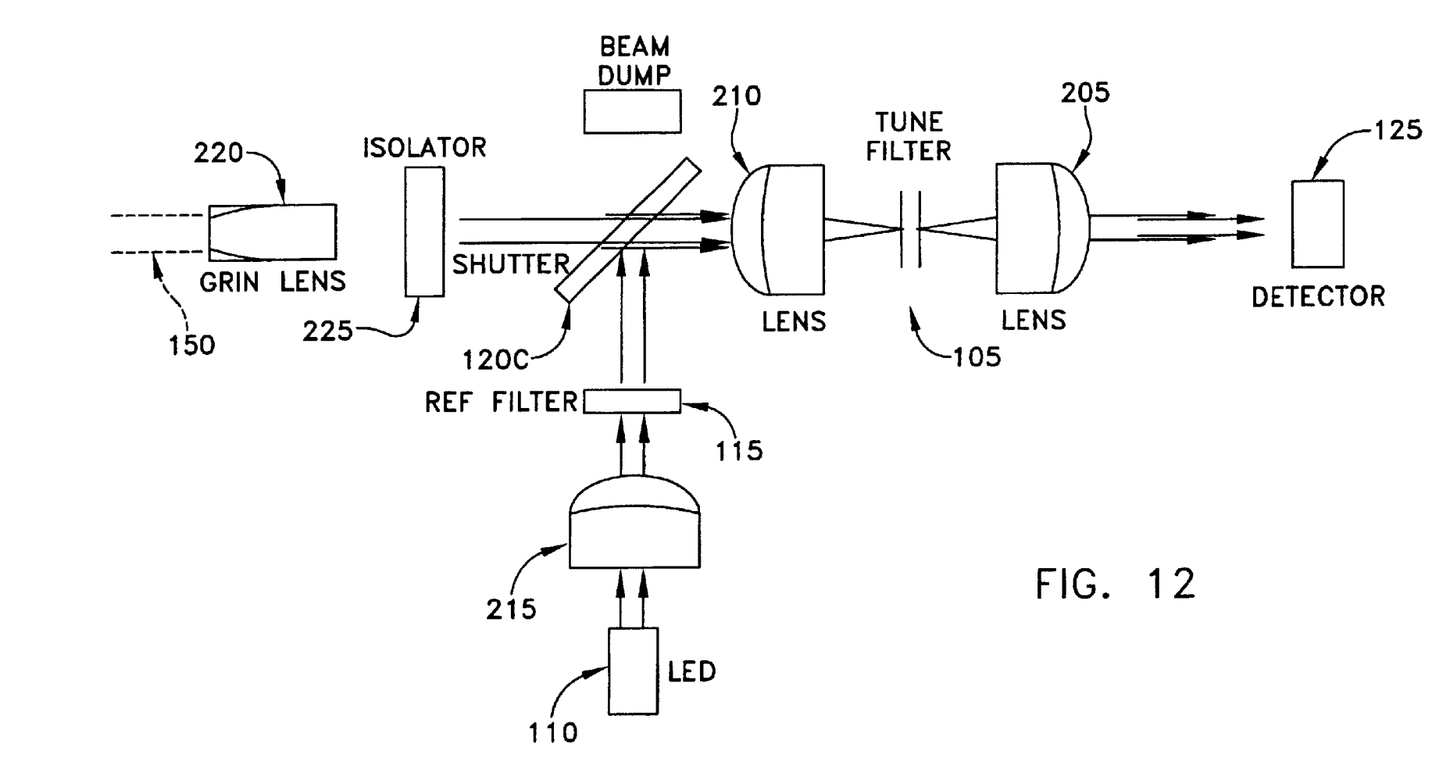
FIG. 12 is a schematic diagram like that of FIG. 11, except that it has been modified to show only the calibration light path.

Looking next at FIG. 12, optical system 200A is intended to be calibrated as follows. Shutter 120C is placed in its first position and LED 110 is energized so that its light passes through lens 215, through etalon 115, reflects off shutter 120C, passes through lens 210, through tunable filter 105, through lens 205 and onto detector 125A. Then tunable filter 105 is swept through its tuning range (i.e., by sweeping the tuning voltage applied to the tunable filter) as detector 125 is monitored, so as to calibrate the tunable filter in the manner previously described.

Figure 13:
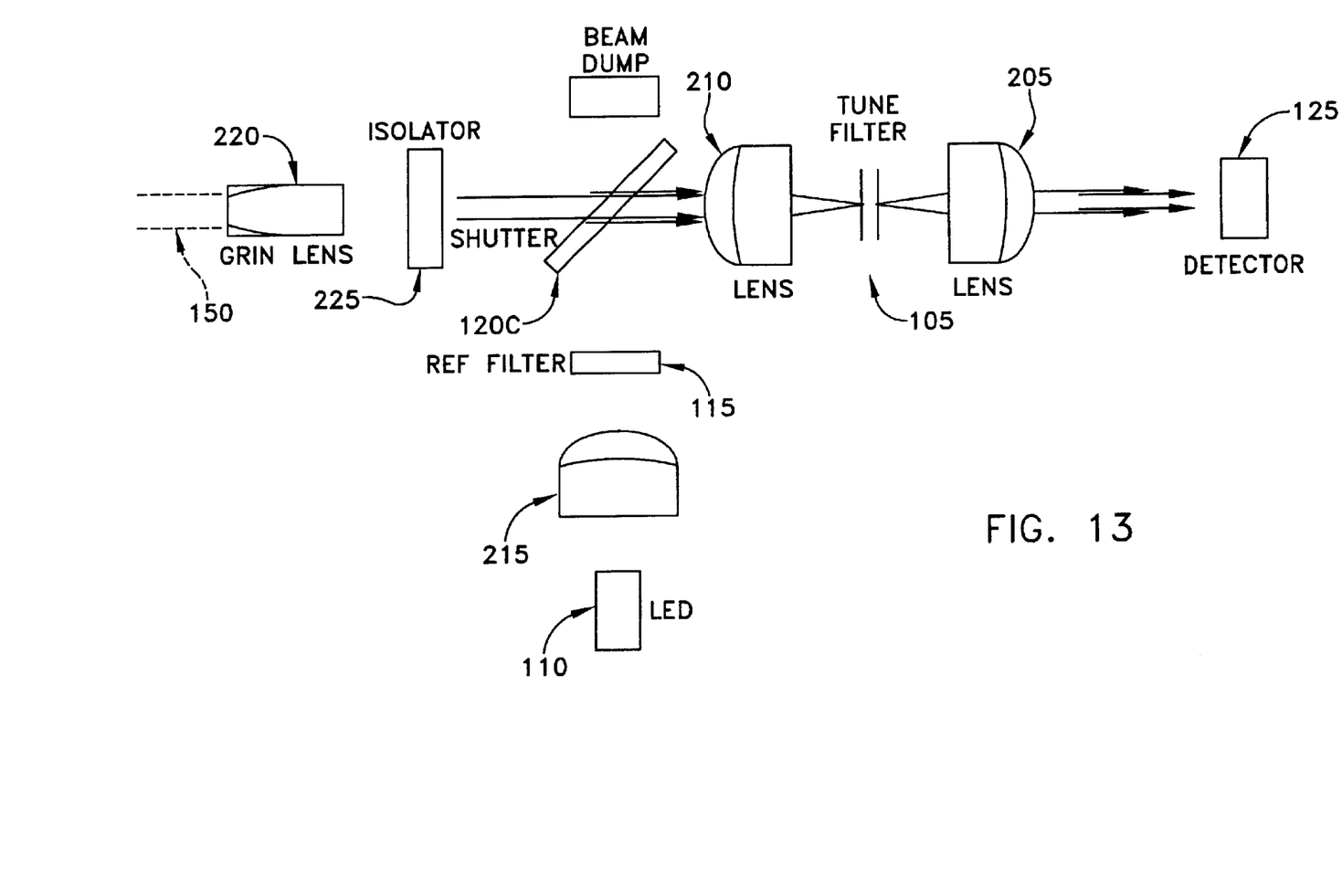
FIG. 13 is a schematic diagram like that of FIG. 11, except that it has been modified to show only the input signal light path.

Looking next at FIG. 13, optical system 200 may then be used to monitor the different channels on an optical fiber as follows. Shutter 120C is placed in its second position and a signal from line 150 passes through GRIN lens 220, through isolator 225, past shutter 120C, through lens 210, through tunable filter 105, though lens 205 and onto detector 125. Then tunable filter 105 is tuned (i.e., by appropriately setting its tuning voltage) to a first channel which is to be monitored, and detector 125 is monitored to determine if there is a signal present on the first channel and, if desired, the nature of the signal. Then tunable filter 105 is tuned (i.e., by appropriately changing its tuning voltage) to a second channel which is to be monitored, and detector 125 is used to check the signal on this second channel. This process may be repeated as desired so as to provide the desired channel monitoring.

Significantly, tunable filter 105 may be re-calibrated at any time, e.g., by re-setting shutter 120C back to its first position, energizing LED 110 and monitoring detector 125 as tunable filter 105 is swept across its tuning range, whereby to re-calibrate tunable filter 105 in the manner previously described.

It will be appreciated that optical system 200A utilizes shutter 120C in place of the two beam splitters 120A and 120B. This eliminates the power losses associated with the two beam splitters. In addition, the system requires only a single detector. In this instance the signal and calibration beams are co-propagating rather than counter-propagating.

A further enhancement is to include detector amplifiers within the package. This can be a linear or logarithmic response amplifier, depending on the system requirements. Amplifier integration is advantageous because it helps reduce system size.

The entire assembly is preferably, but not necessarily, assembled on a ceramic substrate and mounted on a thermo-electric cooler within a 14 (or greater) pin butterfly package.

It is to be understood that the present invention is by no means limited to the particular constructions and method steps disclosed above and/or shown in the drawings, but also comprises any modifications or equivalents within the scope of the claims.

What is claimed is:

1. A wavelength reference apparatus for use in calibrating a tunable filter, whereby said tunable filter may be tuned to an optical wavelength, said wavelength apparatus comprising:
    an LED positioned so that light emitted by said LED enters a first end of the tunable filter, said LED having a transmission profile which varies over a range of wavelengths;
    an etalon for receiving light emerging from a second end of the tunable filter, said etalon having a transmission profile which comprises a comb of transmission peaks, with each transmission peak occurring at a precise, known wavelength; and
    a detector for detecting light passing through said etalon.

2. Apparatus according to claim 1 wherein said transmission profile comprises a power output which varies over said range of wavelengths.

3. Apparatus according to claim 1 wherein said comb of transmission peaks are spaced across said range of wavelengths.

4. A fully integrated optical system for monitoring the channels of an optical fiber in a WDM fiberoptic system, said fully integrated optical system comprising:
    a tunable filter having a first end and a second end, said tunable filter being positioned so as to receive light from an optical fiber at said first end of said tunable filter;
    a first beam splitter for receiving light emerging from said second end of said tunable filter;
    a first detector for receiving light from said first beam splitter and detecting the same; and
    wavelength reference apparatus for use in calibrating said tunable filter, whereby said tunable filter may be tuned to a precise, known wavelength, said wavelength reference apparatus comprising:
        an LED positioned so that light emitted by said LED enters said second end of said tunable filter, said LED having an emission profile which varies with wavelength;
        a second beam splitter for receiving light emerging from said first end of said tunable filter;
        an etalon for receiving light from said second beam splitter, said etalon having a transmission profile which comprises a comb of transmission peaks, with each transmission peak occurring at a precise, known wavelength; and
        a second detector for detecting the light passing through said etalon;
    whereby when said LED is energized and said tunable filter is swept through its tuning range by varying the tuning voltage applied to said tunable filter, the known transmission wavelengths established by said LED and said etalon can be correlated to counterpart tuning voltages of said tunable filter, whereby to calibrate said tunable filter; and
    whereby when light from said input is passed through said tunable filter, said tunable filter may be tuned to a selected channel and said first detector may be used to detect light present on that channel.

5. A fully integrated optical system for monitoring the channels of an optical fiber in a WDM fiberoptic system, said fully integrated optical system comprising:
    a tunable filter having a first end and a second end, said tunable filter being positioned so as to receive light from the tunable filter at said first end of said tunable filter;
    a detector for receiving light from said tunable filter and detecting the same; and
    wavelength reference apparatus for use in calibrating said tunable filter, whereby said tunable filter may be tuned to a precise, known wavelength, said wavelength reference apparatus comprising:
        an LED, said LED having an emission profile which varies with wavelength;
        an etalon for receiving light from said LED, said etalon having a transmission profile which comprises a comb of transmission peaks, with each transmission peak occurring at a precise, known wavelength; and
        a shutter having (i) a first position wherein light from said etalon will be directed through said tunable filter and onto said detector, and (ii) a second position wherein light from said input will be directed through said tunable filter and onto said detector;
    whereby when said shutter is placed in said second position and said LED is energized and said tunable filter is swept through its tuning range by varying the tuning voltage applied to said tunable filter, the known transmission wavelengths established by said LED and said etalon can be correlated to counterpart tuning voltages of said tunable filter, whereby to calibrate said tunable filter; and
    whereby when said shutter is placed in said second position and light from said input is passed through said tunable filter, said tunable filter may be tuned to a selected channel and said detector may be used to detect light present on that channel.

* * * * *